US008664343B2

(12) United States Patent
Qin et al.

(10) Patent No.: US 8,664,343 B2
(45) Date of Patent: Mar. 4, 2014

(54) CATALYSTS FOR PREPARING CIS 1,4-POLYDIENES

(75) Inventors: Zengquan Qin, Copley, OH (US); Jason T. Poulton, Stow, OH (US)

(73) Assignee: Bridgestone Corporation, Tokyo (JP)

( * ) Notice: Subject to any disclaimer, the term of this patent is extended or adjusted under 35 U.S.C. 154(b) by 404 days.

(21) Appl. No.: 12/999,846

(22) PCT Filed: Jun. 9, 2009

(86) PCT No.: PCT/US2009/046742
§ 371 (c)(1),
(2), (4) Date: Apr. 11, 2011

(87) PCT Pub. No.: WO2009/155170
PCT Pub. Date: Dec. 23, 2009

(65) Prior Publication Data
US 2011/0184137 A1    Jul. 28, 2011

Related U.S. Application Data

(60) Provisional application No. 61/074,373, filed on Jun. 20, 2008.

(51) Int. Cl.
*C08F 4/52* (2006.01)
*C08F 4/60* (2006.01)
*C08F 4/80* (2006.01)
*B01J 23/40* (2006.01)
*B01J 23/00* (2006.01)

(52) U.S. Cl.
USPC ........... 526/136; 526/135; 526/141; 526/147; 526/137; 526/159; 526/169; 526/169.1; 526/161; 526/172; 526/90; 502/103; 502/104; 502/118; 502/123; 502/128; 502/119

(58) Field of Classification Search
USPC ......... 526/164, 160, 172, 136, 135, 141, 147; 502/103
See application file for complete search history.

(56) References Cited

U.S. PATENT DOCUMENTS

| | | | |
|---|---|---|---|
| 3,170,907 A | 2/1965 | Ueda et al. | |
| 5,519,101 A | 5/1996 | Nubel et al. | |
| 5,686,543 A | 11/1997 | Yasuda et al. | |
| 5,705,619 A * | 1/1998 | Herrmann | 534/10 |
| 6,060,568 A * | 5/2000 | Cavell et al. | 526/131 |
| 6,479,601 B1 | 11/2002 | Kerns et al. | |
| 6,576,724 B2 * | 6/2003 | Olivier-Bourbigou et al. | 526/139 |
| 6,656,867 B2 | 12/2003 | Kerns et al. | |
| 6,667,269 B2 * | 12/2003 | Olivier-Bourbigou et al. | 502/117 |
| 7,078,362 B2 * | 7/2006 | Nagy | 502/103 |
| 7,820,580 B2 | 10/2010 | Qin et al. | |
| 2004/0230015 A1 | 11/2004 | Hinkle et al. | |
| 2005/0090383 A1 | 4/2005 | Thiele et al. | |
| 2005/0215738 A1 | 9/2005 | Goodall et al. | |
| 2006/0211809 A1 | 9/2006 | Kodemura et al. | |
| 2008/0114136 A1 | 5/2008 | Suzuki et al. | |
| 2009/0143551 A1 | 6/2009 | Qin et al. | |
| 2011/0184137 A1 * | 7/2011 | Qin et al. | 526/147 |

FOREIGN PATENT DOCUMENTS

| | | | | |
|---|---|---|---|---|
| CN | 101157737 B | * | 5/2010 | C08F 136/08 |
| DE | 3916211 | | 11/1990 | |
| DE | 296939 A5 | | 12/1991 | |
| WO | 0001739 A1 | | 1/2000 | |
| WO | 0249758 A1 | | 6/2002 | |
| WO | 03048221 A1 | | 6/2003 | |
| WO | WO 2009/155170 A2 | * | 12/2009 | C08F 4/04 |

OTHER PUBLICATIONS

Wei Gao and Dongmei Cui, J., "Highly cis-1,4 Selective Polymerization of Dienes with Homogeneous Ziegler—Natta Catalysts Based on NCNPincer Rare Earth Metal Dichloride Precursors," J. of Am. Chem. Soc., Mar. 2008, vol. 130, No. 14 (pp. 4984-4991).
International Preliminary Report on Patentability, PCT/US2009/046742, International Bureau of WIPO (Dec. 21, 2010) p. 4.
Official Action from Russian Patent Office, Russian Application No. 2011102000 (Jan. 29, 2013) p. 5.
Supplementary European Search Report and Search Opinion, EPO Application No. 09767480.8 (Mar. 14, 2013) p. 8.
English Translation of "Notification of First Office Action" for Chinese Patent Application No. 200980132392.4, Sep. 10, 2012 (5 pp.).
Campora, Juan et al., "Synthesis and Catalytic Activity of Cationic Allyl Complexes of Nickel Stabilized by a Single N-Heterocyclic Carbene Ligand", Organometallic, vol. 25, pp. 3314-3316 (2006).
Dible, Benjamin R. et al., "Unusual Reactivity of Molecular Oxygen with π-Allylnickel (N-heterocyclic carbene) Chloride Complexes", J. Am. Chem. Soc., vol. 125, No. 4, pp. 872-873 and supporting information pp. S1-S43 (2003).
Jang, Youngchan et al., "Effects of Tris(pentaflourophenyl)borane on the Activation of a Metal Alkyl-free Ni-based Catalyst in the Polymerization of 1, 3-Butadiene", J. of Polymer Science: Part A: Polymer Chemistry, vol. 42, No. 5, pp. 1164-1173 (Mar. 1, 2004).
Kwag, Gwanghoon et al., "Ligand Structure and Cocatalyst Effects on High 1.4-cis Polymerization of 1,3-Butadiene Using Ni-Based Catalysts", Polymer J., vol. 31, No. 12, pp. 1274-1276 (1999).
Vignolle, et al., "Stable Noncyclic Singlet Carbenes", Chem. Rev. 2009, 109, pp. 3333-3384.

* cited by examiner

*Primary Examiner* — Rip A. Lee
(74) *Attorney, Agent, or Firm* — Meredith E. Hooker; Nathan T. Lewis

(57) ABSTRACT

A polymerization catalyst composition for preparing cis 1,4-polydienes is provided. The catalyst composition comprises (a) a metal-containing compound, said metal being a transition metal or a lanthanide metal; (b) a carbene, (c) an alkylating agent, and optionally (d) a halogen-containing compound with the proviso that the halogen-containing compound must be present when none of the metal-containing compound and the alkylating agent contain a labile halogen atom. Also provided is a process for producing a polydiene comprising reacting a conjugated diene in the presence of the polymerization catalyst composition.

34 Claims, No Drawings

CATALYSTS FOR PREPARING CIS 1,4-POLYDIENES

CROSS-REFERENCE TO RELATED APPLICATIONS

This application is a national stage application of PCT/US2009/046742 filed on Jun. 9, 2009, which, in turn, claims the benefit of priority to U.S. provisional application 61/074,373, filed on Jun. 20, 2008.

FIELD OF DISCLOSURE

This disclosure relates to catalyst compositions useful for preparing cis 1,4-polydienes.

BACKGROUND

It is known that coordination catalyst systems (Ziegler-Natta type catalysts) may be employed for polymerizing conjugated dienes into cis 1,4-polydienes, for example, polymerizing 1,3-butadiene to form cis-1,4-polybutadiene. Such coordination catalyst systems may be based on transition metals such as titanium, cobalt and nickel, or lanthanide metals such as neodymium.

The cis 1,4-polydienes produced by coordination catalyst systems can have a broad molecular weight distribution. Because a polymer having a narrower molecular weight distribution may offer certain advantages such as higher abrasion resistance, lower hysteresis, and better tensile properties, it is desirable to develop a coordination catalyst system that is capable of producing cis 1,4-polydienes having a narrower molecular weight distribution.

Commonly owned U.S. patent application Ser. No. 12/270,424, filed Nov. 13, 2008, discloses a nickel-based catalyst composition comprising (a) a nickel N-heterocyclic carbene complex, (b) an organoaluminum compound, (c) a fluorine-containing compound, and (d) optionally, an alcohol. The catalyst composition can produce cis 1,4-polydienes, for example, high cis 1,4-polybutadiene with a narrow molecular weight distribution and a low vinyl content. However, the nickel N-heterocyclic carbene complex must be prepared before adding it to the catalyst composition. A need still remains for a catalyst composition that does not require a carbene complex to be prepared outside of (i.e. prior to preparation of) the catalyst composition.

"Vinyl content" is used herein to refer to the amount of pendant vinyl groups on the polymer chain, which result from 1,2-addition rather than 1,4-addition.

"Transition metals" are those that are in groups 3-12 in the IUPAC version of the periodic table.

"Lanthanide metals" are elements 57-71 on the periodic table.

BRIEF SUMMARY OF THE DISCLOSURE

The present disclosure provides a polymerization catalyst composition comprising:
(a) a metal-containing compound, said metal being selected from the group consisting of transition metals and lanthanide metals;
(b) a carbene;
(c) an alkylating agent; and optionally
(d) a halogen-containing compound that includes one or more labile halogen atoms, with the proviso that the halogen-containing compound must be present when none of the metal-containing compound and the alkylating agent contain a labile halogen atom.

Also provided is a process for producing a polydiene comprising reacting a conjugated diene in the presence of a polymerization catalyst composition comprising:
(a) a metal-containing compound, said metal being selected from the group consisting of transition metals and lanthanide metals;
(b) a carbene;
(c) an alkylating agent; and optionally
(d) a halogen-containing compound that includes one or more labile halogen atoms, with the proviso that the halogen-containing compound must be present when none of the metal-containing compound and the alkylating agent contain a labile halogen atom.

In a preferred embodiment, the conjugated diene is 1,3-butadiene.

DETAILED DESCRIPTION

The present disclosure is directed towards a polymerization catalyst composition that comprises (a) a metal-containing compound, said metal being selected from the group consisting of transition metals and lanthanide metals; (b) a carbene; (c) an alkylating agent; and optionally (d) a halogen-containing compound that includes one or more labile halogen atoms, with the proviso that the halogen-containing compound must be present when none of the metal-containing compound and the alkylating agent contain a labile halogen atom.

Generally, the metal-containing compound may be any compound that acts as a Ziegler-Natta type catalyst for the polymerization of dienes. Such compounds are well known to those skilled in the art, and include compounds containing transition metals such as titanium, cobalt, and nickel; and compounds containing lanthanide metals such as lanthanum, neodymium, cerium, praseodymium, promethium, samarium, europium, gadolinium, terbium, dysprosium, holmium, erbium, thulium, ytterbium, lutetium, and didymium.

Of the metal-containing compounds having a transition metal, those that contain nickel are preferred. The nickel-containing compound may be any nickel salt or nickel salt of organic acid containing from about 1 to 20 carbon atoms. Some representative examples of nickel-containing compounds include, but are not limited to, nickel benzoate, nickel acetate, nickel naphthenate, nickel octanoate, nickel neodecanoate, bis(α-furyl dioxime)nickel, nickel palmitate, nickel stearate, nickel acetylacetonate, nickel salicaldehyde, bis(cyclopentadiene)nickel, bis(salicylaldehyde)ethylene diimine nickel, cyclopentadienyl-nickel nitrosyl, bis($\eta^3$-allyl)nickel, bis(π-cycloocta-1,5-diene)nickel, bis($\eta^3$-allyl nickel trifluoroacetate), nickel tetracarbonyl, nickel boroacylate, and mixtures thereof. Other suitable nickel-containing compounds include, but are not limited to, nickel carboxylate borates, such as those having the formula $(RCOONiO)_3B$, where R is a hydrogen atom or a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Specific examples of nickel carboxylate borate include nickel neodecanoate borate, nickel hexanoate borate, nickel naphthenate borate, nickel stearate borate, nickel octoate borate, nickel 2-ethylhexanoate borate, and mixtures thereof.

A preferred nickel-containing compound is a nickel salt of a carboxylic acid or an organic complex compound of nickel. Nickel naphthenate, nickel octanoate, and nickel neodecanoate are highly preferred nickel-containing compounds. Nickel 2-ethylhexanoate, which is commonly referred to as nickel octanoate, is the nickel-containing compound which is most commonly used due to economic factors.

Suitable cobalt-containing compounds include, but are not limited to, cobalt benzoate, cobalt acetate, cobalt naphthenate, bis(α-furyl dioxime)cobalt, cobalt octanoate, cobalt palmitate, cobalt stearate, cobalt acetylacetonate, bis(salicylaldehyde ethylene diimine)cobalt, cobalt salicylaldehyde, and dicobalt octacarbonyl.

As for the metal-containing compounds having a lanthanide metal, the lanthanide atom can be in various oxidation states including, but not limited to, the 0, +2, +3, and +4 oxidation states. Trivalent lanthanide compounds, where the lanthanide atom is in the +3 oxidation state, are preferred. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. Of the metal-containing compounds having a lanthanide metal, those that contain neodymium are preferred.

Suitable neodymium carboxylates include neodymium formate, neodymium acetate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate, neodymium naphthenate, neodymium stearate, neodymium oleate, neodymium benzoate, and neodymium picolinate.

Suitable neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl(2-ethylhexyl)phosphate, neodymium(1-methylheptyl)(2-ethylhexyl)phosphate, and neodymium(2-ethylhexyl)(p-nonylphenyl)phosphate.

Suitable neodymium organophosphonates include neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium(2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium(1-methylheptyl)(1-methylheptyl)phosphonate, neodymium(2-ethylhexyl)(2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium(p-nonylphenyl)(p-nonylphenyl)phosphonate, neodymium butyl(2-ethylhexyl)phosphonate, neodymium (2-ethylhexyl)butylphosphonate, neodymium(1-methylheptyl)(2-ethylhexyl)phosphonate, neodymium(2-ethylhexyl)(1-methylheptyl)phosphonate, neodymium(2-ethylhexyl)(p-nonylphenyephosphonate, and neodymium(p-nonylphenyl)(2-ethylhexyl)phosphonate.

Suitable neodymium organophosphinates include neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium(1-methylheptyl)(2-ethylhexyl)phosphinate, and neodymium(2-ethylhexyl)(p-nonylphenyl)phosphinate.

Suitable neodymium carbamates include neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include neodymium methylxanthate, neodymium ethylxanthate, neodymium isopropylxanthate, neodymium butylxanthate, and neodymium benzylxanthate.

Suitable neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can serve as both the lanthanide compound as well as the halogen-containing compound. A Lewis base such as tetrahydrofuran (THF) may be employed as an aid for solubilizing this class of neodymium compounds in inert organic solvents.

The term organolanthanide compound refers to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn$(cyclooctatetraene), (C$_5$Me$_5$)$_2$LnR, LnR$_3$, Ln(allyl)3, and Ln(allyl)$_2$Cl, where Ln represents a lanthanide atom, and R represents a hydrocarbyl group.

A carbene is used as component (b) of the catalyst composition. Preferably, the carbene is a N-heterocyclic carbene. Suitable N-heterocyclic carbenes include, but are not limited to, those having a structure according to either Formula I or II:

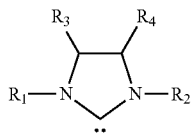

I

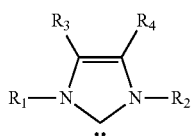

II wherein R$_1$ and R$_2$ are selected from the group consisting of C$_1$-C$_{12}$ alkyl, C$_2$-C$_{12}$ alkene, C$_2$-C$_{12}$ alkyne, phenyl, alkyl-substituted phenyl, and mixtures thereof and may all be identical or may all be separately selected but cannot be H; and R$_3$ and R$_4$ are selected from the group consisting of H, C$_1$-C$_{12}$ alkyl, C$_2$-C$_{12}$ alkene, C$_2$-C$_{12}$ alkyne, phenyl, alkyl-substituted phenyl, and mixtures thereof and may all be identical or may all be separately selected.

Suitable N-heterocyclic carbenes include, but are not limited to, 1,3-diisopropyl-4,5-dimethylimidazol-2-ylidene, 1,3-bis-(2,4,6-trimethylphenyl)-imidazol-2-ylidene, 1,3-bis-(2,6-diisopropylphenyl)-imidazol-2-ylidene (represented by Formula IV), 1,3-dicyclohexylimidazol-2-ylidene, 1,3-di-tert-butylimidazol-2-ylidene, 1,3-diadamantylimidazol-2-ylidene, 1,3-bis-(2,6-diisopropylphenyl)-4,5-dihydroimidazolin-2-ylidene (represented by Formula III), and mixtures thereof. Carbenes according to Formulas III and IV can be prepared by the method disclosed in B. R. Dible, M. S. Sigman, *J. Am. Chem. Soc.*, 2003, 125, 872, hereby incorporated by reference in its entirety. Additionally, many carbenes according to Formulas I-IV are commercially available from suppliers such as Strem Chemicals, Inc. and Sigma-Aldrich Co.

In one particular preferred embodiment, the N-heterocyclic carbene may have a structure according to either Formula III or IV:

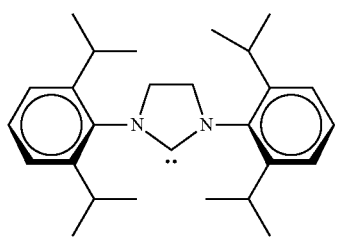

III

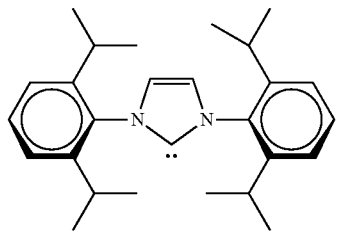

IV

Various alkylating agents, or mixtures thereof, can be used as component (c) of the catalyst composition. Alkylating agents, which may also be referred to as hydrocarbylating agents, are organometallic compounds that can transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound.

The term "organoaluminum compound" refers to any aluminum compound containing at least one aluminum-carbon bond. Organoaluminum compounds that are soluble in a hydrocarbon solvent are preferred. A preferred class of organoaluminum compounds that can be utilized is represented by the general formula AlR$^5{}_n$X$_{3-n}$, where each R$^5$, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R$^5$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Suitable organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. Trihydrocarbylaluminum, dihydrocarbylaluminum hydride, and hydrocarbylaluminum dihydride compounds are preferred.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, dipropylaluminum, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichlorides include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of suitable organoaluminum compounds is aluminoxanes. Aluminoxanes comprise oligomeric linear aluminoxanes that can be represented by the general formula:

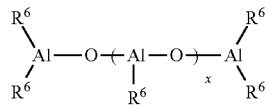

and oligomeric cyclic aluminoxanes that can be represented by the general formula:

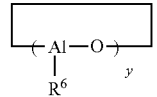

where x is an integer of 1 to about 100, preferably about 10 to about 50; y is an integer of 2 to about 100, preferably about 3 to about 20; and where each $R^6$, which may be the same or different, is a mono-valent organic group that is attached to the aluminum atom via a carbon atom. Preferably, each $R^6$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful because of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one preferred embodiment, methyl aluminoxane and diisobutyl aluminum hydride are employed in combination.

The term "organomagnesium compound" refers to any magnesium compound that contains at least one magnesium-carbon bond. Organomagnesium compounds that are soluble in a hydrocarbon solvent are preferred. A preferred class of organomagnesium compounds that can be utilized is represented by the general formula $MgR^7_2$, where each $R^7$, which may be the same or different, is a mono-valent organic group, with the proviso that the group is attached to the magnesium atom via a carbon atom. Preferably, each $R^7$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Some specific examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium is particularly useful due to its availability and its solubility in aliphatic and cycloaliphatic hydrocarbon solvents.

Another class of organomagnesium compounds that can be utilized as ingredient (c) is represented by the general formula $R^8MgX$, where $R^8$ is a mono-valent organic group, with the proviso that the group is attached to the magnesium atom via a carbon atom, and X is a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and the halogen-containing compound. Preferably, $R^8$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. Preferably, X is a carboxylate group, an alkoxide group, or an aryloxide group, with each group preferably containing 1 to 20 carbon atoms.

Some suitable types of organomagnesium compounds that are represented by the general formula $R^8MgX$ include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Some specific examples of suitable organomagnesium compounds that are represented by the general formula $R^8MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various compounds, or mixtures thereof, that contain one or more labile halogen atoms can be employed as ingredient (d) of the catalyst composition. These compounds may simply be referred to as halogen-containing compounds. Examples of halogen atoms include, but are not limited to, fluorine, chlorine, bromine, and iodine. A combination of two or more halogen atoms can also be utilized. Halogen-containing compounds that are soluble in a hydrocarbon solvent are preferred. Hydrocarbon-insoluble halogen-containing compounds, however, can be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

Suitable elemental halogens include fluorine, chlorine, bromine, and iodine. Some specific examples of suitable mixed halogens include iodine monochloride, iodine monobromide, iodine trichloride, and iodine pentafluoride.

Suitable hydrogen halides include hydrogen fluoride, hydrogen chloride, hydrogen bromide, and hydrogen iodide.

Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

If the metal-containing compound in component (a) of the catalyst composition contains a transition metal, it may be desirable that the halogen-containing compound be a fluorine-containing compound. Suitable fluorine-containing compounds include, but are not limited to, hydrogen fluoride, boron trifluoride, silicon tetrafluoride, aluminum trifluoride, indium trifluoride, zinc difluoride, dimethylaluminum fluoride, diethyl aluminum fluoride, methylaluminum difluoride. Preferable fluorine-containing compounds include hydrogen fluoride, boron trifluoride, and hydrogen fluoride and boron trifluoride complexed with a member of the class consisting of monohydric alcohols, phenols, water, mineral acids containing oxygen, water, aldehydes, esters, ethers, ketones and nitriles.

The ketone subclass can be defined by the formula $R^9COR^{10}$ where $R^9$ and $R^{10}$ represent a alkyl, cycloalkyl, aryl, alkaryl and arylalkyl radicals containing from 1 to about 30 carbon atoms; $R^9$ and $R^{10}$ may be the same or dissimilar. These ketones represent a class of compounds which have a carbon atom attached by a double bond to oxygen. Representative but not exhaustive of the ketones useful in the preparation of the boron trifluoride and hydrogen fluoride complexes of this disclosure are acetone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. Typical complexes of the ketones are boron trifluoride.acetophenone and boron trifluoride.benzophenone, also hydrogen fluoride.acetophenone and hydrogen fluoride.benzophenone and hydrogen fluoride.

The aldehyde subclass can be defined by the formula $R^{11}$—CHO where $R^{11}$ represents an alkyl, cycloalkyl, aryl, alkaryl and arylalkyl radical containing from 1 to about 30 carbon atoms. The aldehydes have a carbon atom attached to an oxygen atom by means of a double bond. Representative but not exhaustive of the aldehydes are butyraldehyde, anisaldehyde, cinnamic aldehyde, isobutyraldehyde, heptaldehyde, dodecylaldehyde, benzaldehyde, phenylacetaldehyde, tolualdehyde, m-nitrobenzaldehyde, p-nitrobenzaldehyde, m-hydrobenzaldehyde and the like. Typical complexes that may be formed from the aldehydes are boron trifluoride-benzaldehyde, boron trifluoride-tolualdehyde, hydrogen fluoride-benzaldehyde and hydrogen fluoride-tolualdehyde, for example.

The ester subclass can be represented by the formula $R^{12}$—COOR$^{13}$ where $R^{12}$ and $R^{13}$ are represented by alkyl, cycloalkyl, aryl, alkaryl, and arylalkyl radicals containing from 1 to about 30 carbon atoms. The esters contain a carbon atom attached by a double bond to an oxygen atom. Representative but not exhaustive of the esters are ethyl butyrate, ethyl octanoate, isopropyl hexanoate, amyl acetate, hexyl propionate, cetyl acetate, ethyl benzoate, amyl benzoate, phenyl acetate, phenyl butyrate, phenyl benzoate and the like. Typical complexes formed from the esters are boron trifluoride-ethyl benzoate and boron trifluoride-phenyl acetate; also hydrogen fluoride-ethyl benzoate, and hydrogen fluoride-phenyl acetate, for example.

The ether subclass can be defined by the formula $R^{14}$—O—$R^{14}$ where each $R^{14}$ independently represents an alkyl, cycloalkyl, aryl, alkaryl and arylalkyl radical containing from 1 to about 30 carbon atoms. Representative but not exhaustive of the ethers are ethoxybutane, ethoxyoctane, isopropoxyhexane, propoxyhexane, ethoxybenzene, amyloxybenzene and the like.

The nitrile subclass can be represented by the formula $R^{15}CN$ wherein $R^{15}$ represents an alkyl, cycloalkyl aryl, alkaryl, and arylalkyl. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. Typical complexes prepared from the nitrites are boron trifluoride.benzonitrile, and hydrogen fluoride.benzonitrile, for example.

The monohydric alcohol subgroup of the above class of compounds can be symbolically portrayed as $R^{16}OH$ where $R^{16}$ represents an alkyl, cycloalkyl, and an arylalkyl radical containing from 1 to 30 carbon atoms. Representative, but not exhaustive of the alcohol group, are methanol, ethanol, n-propanol, isopropanol, n-butanol, benzyl alcohol, and the like. Typical complexes formed from the above groups are as follows: $BF_3$ methanol, $BF_3$ ethanol, $BF_3$ butanol, $BF_3$ n-hexanol, HF methanol, HF butanol and HF hexanol, for example.

The phenol subgroup of the above class of compounds can be symbolically portrayed as PHI—OH wherein PHI represents a benzenoid group. Representative but not exhaustive of the phenol group are phenol, p-cresol, resorcinol, naphthol, hydroquinone and the like. Typical complexes formed from the above phenol subgroup are as follows: $BF_3$ 2-phenol, $BF_3$ p-cresol, HF p-cresol and HF phenol, for example.

A number of the members in the subgroup mineral acids containing oxygen will complex with $BF_3$ and HF. Representative but not exhaustive of the mineral acid subgroup are phosphoric acid, sulfuric acid, nitric acid and the like. Examples of complexes formed from the mineral acid subgroup are $BF_3$ 100% phosphoric acid, $BF_3$ 85% phosphoric acid and HF 100% phosphoric acid, for example.

Water, although in a subgroup by itself, forms at least two hydrate complexes. These are $BF_3.H_2O$ and $BF_3.2H_2O$.

When not available commercially, many of the boron trifluoride complexes can be readily formed by directly contacting boron trifluoride gas, (a colorless gas at ordinary temperatures and pressures) with a compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas, and the electron donor compound, or when convenient, the reaction may be carried out in the medium of an inert organic diluent. This last condition is usually necessary when the electron donor compound exists as a solid and must be put into solution or suspension to insure adequate contact with the $BF_3$ gas.

The various boron trifluoride complexes vary greatly in their shelf life stability. Some, for example, $BF_3$.isopropanol, are quite unstable in daylight at room temperature. Others, for example, $BF_3$.phenol are quite stable and possess a relatively long shelf life at room temperature. Where the particular $BF_3$ complex possesses an unstable shelf life, it is desirable for it to be prepared as near to the time of polymerization as feasible.

Hydrogen fluoride complexes usually have a lower vapor pressure and do not fume as much as hydrogen fluoride. Hydrogen fluoride boils at 19.7° C., whereas a 40% by weight of hydrogen fluoride diethyl ether azeotrope boils at 74° C. When the hydrogen fluoride is complexed, the corrosiveness of the hydrogen fluoride is reduced. The hydrogen fluoride complex can be dissolved in a solvent and thus can be handled and charged to the system as a liquid solution. The solvent which can be employed may be an alkyl, alkaryl, arylalkyl or an aryl hydrocarbon. Toluene, for example, is a convenient solvent system.

The $BF_3$ and HF complexes may be prepared by dissolving appropriate amounts of the complexing agent, for instance, a ketone, an ether, an ester, an alcohol, a nitrile or water, in a suitable solvent and an appropriate amount of the hydrogen fluoride in a suitable solvent and mixing the two solvent systems. The mixing of the complexing agents, except water, may be done in the absence of water vapor. Another possible method would be to dissolve either the hydrogen fluoride or the complexing agent in a suitable solvent and add the other component. Still another method of mixing would be to dissolve the complexing agent in a solvent and bubble gaseous hydrogen fluoride through the system until the complexing agent is reacted with hydrogen fluoride. The concentrations may be determined by weight gain or chemical titration. The desired amount of complexing agent may be within a range depending on the conditions of the reaction system, the hydrogen bonding strength of the complexing agent, the size of the complexing agent, or it may be an equilibrium between the hydrogen fluoride complex and the hydrogen fluoride plus the complexing agent.

The optimum concentration of any one catalyst component is dependent upon the concentration of each of the other catalyst components. Furthermore, the concentration of the catalyst employed depends on factors such as purity, rate desired, temperature and other factors. While polymerization will occur over a wide range of catalyst concentrations and mole ratios, polymers having the most desirable properties are obtained over a more narrow range.

In one embodiment, the metal-containing compound is present in a catalytic amount of from about 0.01 mmol metal/100 g monomer to about 0.4 mmol metal/100 g monomer, and preferably is present in a catalytic amount of from about 0.02 mmol metal/100 g monomer to about 0.2 mmol metal/100 g monomer. The carbene may be present in a catalytic amount of from about 0.01 mmol carbene/100 g monomer to about 0.4 mmol carbene/100 g monomer, and preferably is present in a catalytic amount of about 0.02 mmol carbene/100 g monomer to about 0.2 mmol carbene/100 g monomer. The alkylating agent may be present in a catalytic amount of from about 0.15 mmol alkylating metal/100 g monomer to about 20.0 mmol alkylating metal/100 g monomer, and preferably is present in a catalytic amount of about 0.30 mmol alkylating metal/100 g monomer to about 6.0 mmol alkylating metal/100 g monomer (the term "alkylating metal" refers to the metal in the alkylating agent). The halogen-containing compound may be present in a catalytic amount of from about 0.01 mmol halogen/100 g monomer to about 12.0 mmol halogen/100 g monomer, and preferably is present in a catalytic amount of about 0.04 mmol halogen/100 g monomer to about 6.0 mmol halogen/100 g monomer.

The catalyst composition may be formed by combining or mixing the metal-containing compound, the carbene, the alkylating agent, and optionally the halogen-containing compound.

Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this disclosure can be formed by using one of the following methods.

First, the catalyst composition may be formed in situ by adding the catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the metal-containing compound is added first, followed by the alkylating agent, followed by the carbene, followed by the halogen-containing compound.

Second, the catalyst ingredients may be pre-mixed outside the polymerization system at an appropriate temperature, which is generally from about $-20°$ C. to about $80°$ C., and the resulting catalyst composition is then added to the monomer solution.

Third, the catalyst composition may be pre-formed in the presence of at least one conjugated diene monomer. That is, the catalyst ingredients are pre-mixed in the presence of a small amount of conjugated diene monomer at an appropriate temperature, which is generally from about $-20°$ C. to about $80°$ C. The amount of conjugated diene monomer that is used for pre-forming the catalyst can range from about 1 to about 500 moles per mole, more preferably from about 5 to about 250 moles per mole, and even more preferably from about 10 to about 100 moles per mole of the metal-containing compound. The resulting catalyst composition is then added to the remainder of the conjugated diene monomer that is to be polymerized. The pre-formed catalyst may be formed by adding the catalyst ingredients and at least one conjugated diene monomer either in a stepwise or simultaneous manner. When adding the catalyst ingredients and conjugated diene monomer in a stepwise manner, the sequence in which the catalyst ingredients and conjugated diene monomer are added is not critical. Preferably, however, the conjugated diene monomer is added first, followed by the metal-containing compound, followed by the alkylating agent, followed by the carbene, followed by the halogen-containing compound.

Fourth, the catalyst composition may be formed by using a two-stage procedure. The first stage involves combining the alkylating agent with the metal-containing compound and carbene in the absence of conjugated diene monomer or in the presence of a small amount of conjugated diene monomer at an appropriate temperature, which is generally from about $-20°$ C. to about $80°$ C. In the second stage, the foregoing reaction mixture and the remaining catalyst component (i.e., the halogen-containing compound), if necessary, are charged in either a stepwise or simultaneous manner to the remainder of the conjugated diene monomer that is to be polymerized.

In any of the above-mentioned procedures to form the catalyst composition, it may be desired that the metal-containing compound and the carbene are combined in the presence of at least one of said conjugated diene, said alkylating agent, or, if present, said halogen-containing compound. In other words, it may be desired that the metal-containing compound and the carbene are not combined by themselves.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. The organic solvent is preferably inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The polymerization is preferably carried out in an organic solvent as the diluent. In one embodiment, a solution polymerization system is employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized is in a condensed phase. Also, the catalyst ingredients are preferably solubilized or suspended within the organic solvent. In other words, the catalyst ingredients are preferably not impregnated onto a catalyst support.

In performing these polymerizations, an amount of organic solvent in addition to the amount of organic solvent that may be used in preparing the catalyst composition is preferably added to the polymerization system. The additional organic solvent may be the same as or different from the organic solvent used in preparing the catalyst composition. An organic solvent that is inert with respect to the catalyst composition employed to catalyze the polymerization is preferably selected. Exemplary hydrocarbon solvents have been set forth above. When a solvent is employed, the concentration of the monomer to be polymerized is not limited to any particular amount. Preferably, however, the concentration of the monomer present in the polymerization medium at the beginning of the polymerization should be in a range of from about 3% to about 80% by weight, more preferably from about 5% to about 50% by weight, and even more preferably from about 10% to about 30% by weight of the combined weight of the polymerization medium and monomer.

The polymerization may also be carried out by means of bulk polymerization, which refers to a polymerization environment where no separate solvents are employed. The bulk polymerization can be conducted either in a condensed liquid phase or in a gas phase.

The polymerization may be carried out as a batch process, a continuous process, or a semi-continuous process. In the semi-continuous process, monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as about −10° C. or below, to a high temperature such as about 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization stopping agent to inactivate the catalyst. Typically, the period of polymerization is from about 20 minutes to about 24 hours and will depend on other polymerization conditions such as temperature as well as the choice of catalyst. Typically, the stopping agent employed is a protic compound, which includes, but is not limited to, an alcohol, a carboxylic acid, an inorganic acid, water, or a mixture thereof.

In one embodiment a stopping agent mixture for use in the present disclosure includes an inorganic base in an amine-water mixture. When $BF_3$ is used as the halogen-containing compound and a mixture of water and an amine are used to stop the polymerization, the water reacts with the organoaluminum compound and/or $BF_3$ to deactivate the catalyst components, leaving the amine available to react with the trialkylboranes. The use of an amine-water mixture is detailed in commonly assigned U.S. Pat. No. 6,596,825, entitled "Low Gel High Cis Polydiene," the disclosure of which is incorporated herein by reference in its entirety. The inorganic base can be used to neutralize the acidic by-products of the stopping and polymerization reactions. This allows for the addition of less amine and reduces or eliminates corrosion in the reaction vessel by raising the pH of the system.

The inorganic base/amine/water mixture may be added in conjunction or in series. In one embodiment the mixture may be added in series. The molar ratio of amine:water may be about 1:100, and in a more specific embodiment about 1:500. The water component of the stopping agent mixture may additionally include an alcohol. In one embodiment the alcohols are one or more of methanol, ethanol, isopropanol, propanol, and butanol. When included, a water:alcohol ratio may be about 1:500, and in a more specific embodiment, about 1:50. Alternately, the water can be omitted from the stopping agent mixture such that the stopping agent mixture includes only an amine/inorganic base mixture.

Suitable amines include ammonia, ammonium hydroxide, primary amine, secondary amine, tertiary amine, aliphatic amine and aromatic amine. Exemplary amines include, but are not limited to, pyridine, aniline, benzylamine, n-butylamine, cyclohexylamine, diethylamine, diisopropylamine, dimethylamine, diphenylamine, ethylamine, ethylenediamine, hexamethylene diamine, N,N-diethylcyclohexylamine, N,N-dimethylcyclohexylamine, N,N,N'-trimethyl ethylene diamine, N,N,N'N'-tetramethyl ethylene diamine (TMEDA); and substituted pyridines such as N,N-dimethylaminopyridine (DMAP), 4-pyrrolidinopyridine, and 4-piperidinopyridine. TMEDA may be used as the amine component of the stopping agent mixture, with or without the use of water.

Another suitable stopping agent mixture includes a carboxylic acid and an inorganic base. The inorganic base includes those described above. Suitable carboxylic acids include those represented by the formula:

wherein $R^{17}$ is selected from the group consisting of alkyl, cycloalkyl and arylalkyl substituted or unsubstituted containing from 3 to 20 carbon atoms. A carboxylic acid that can be used for use in the stopping agent mixture is 2-ethyl hexanoic acid (EHA). A metal salt of a carboxylic acid may also be added to the stopping agent mixture. Thus, another suitable stopping agent mixture includes a mixture of EHA and the calcium salt of EHA. As with the amine based suitable stopping agent mixture described above, water may or may not be included in the carboxylic acid based stopping agent mixture. Again, the inorganic base is thought to react with acid byproducts believed to be produced during polymerization as well as any acidic products that may result from residual water reacting with the EHA or other carboxylic acid used.

When used with both the amine and the carboxylic acid, the amount of inorganic base added to the reaction mixture is preferably enough to maintain the pH in the reaction vessel above 7. In one embodiment, an amount of inorganic base is added to adjust the pH to about 7-9. Although not intended to be limiting, a suitable amount for use in the present disclosure is an amount equal to the molar equivalent of the halogen ions present in the reaction mixture from the halogen-containing compound. The use of the inorganic base in the stopping agent mixture reduces the amount of amine necessary to effectively stop the polymerization.

An antioxidant such as 2,6-di-tert-butyl-4-methylphenol may be added along with, before, or after the addition of the stopping agent. The amount of the antioxidant employed is usually in the range of 0.2% to 1% by weight of the polymer product.

When the polymerization has been stopped, polymer product can be recovered from the polymerization mixture by utilizing conventional procedures of desolventization and drying. For instance, the polymer may be isolated from the polymerization mixture by coagulating the polymerization mixture with an alcohol such as methanol, ethanol, or isopropanol, followed by filtration, or by steam distilling the solvent and the unreacted monomer, followed by filtration. The isolated polymer product is then dried to remove residual amounts of solvent and water. Alternatively, the polymer may be isolated from the polymerization mixture by directly drum drying the polymer cement.

The catalyst composition of this disclosure exhibits high catalytic activity for polymerizing conjugated dienes into high cis-1,4-polydienes. Although one preferred embodiment is directed toward the polymerization of 1,3-butadiene into cis-1,4-polybutadiene, other conjugated dienes can also be polymerized. Some specific examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The high cis-1,4-polydienes polymerized using the catalyst composition disclosed herein will typically have cis-1,4 content of at least about 90%, and preferably at least 95%. The high cis-1,4-polydienes also typically have a number average molecular weight range of from about 75,000 to about 200,000, a molecular weight distribution of from about 2 to about 4, and a vinyl content of less than about 2%. Molecular weight distribution is commonly known as the value obtained when dividing the weight-average molecular weight by the number-average molecular weight.

The high cis-1,4-polydienes produced with the catalyst composition disclosed herein have many uses. They can be blended with various natural or synthetic rubbers in order to improve the properties thereof. For example, they can be incorporated into elastomers in order to improve tensile properties, abrasion and fatigue resistance, and to reduce hysteresis loss. Accordingly, the cis-1,4-polydienes, especially high cis-1,4-polybutadiene, are useful in rubber compositions that are useful for tire treads and tire sidewalls.

In order to demonstrate the practice of the present disclosure, the following examples have been prepared and tested. The examples should not, however, be viewed as limiting the scope of the invention. The claims will serve to define the invention.

EXAMPLES

In the Examples, parts and % are by weight unless otherwise specified.

In the Examples, the following methods were employed in determining polymer properties. The molecular weight was determined by GPC (gel permeation chromatography) using a polybutadiene standard and THF as a solvent. The cis-1,4, trans-1,4, and vinyl contents were determined by subjecting a polymer sample dissolved in $CS_2$ to FTIR.

Comparative Example

To a dry bottle purged with nitrogen was added hexane and 1,3-butadiene (Bd) blend in hexane, resulting in a 350 g of 15.0% Bd solution in hexane. To the solution was charged a pre-formed catalyst solution mixed in the order of Bd solution (19.7% Bd, 2.5 ml), triisobutylaluminum (TIBA) solution (0.68 M, 0.35 mL), nickel octanoate solution (0.050 M, 0.53 mL). Finally, boron trifluoride dibutyl etherate solution (1.0 M, 0.59 mL) was charged. The bottle was placed in a 65° C. water bath for four hours. The reaction mixture was treated with isopropanol containing 2,6-di-tert-butyl-4-methylphenol (BHT) in order to deactivate the catalyst, coagulate and stabilize the polymer. The polybutadiene was then dried in a drum-dryer at 120° C. The polymer properties are shown in Table 1.

Example 1

To a dry bottle purged with nitrogen was added hexane and 1,3-butadiene (Bd) blend in hexane, resulting in a 350 g of 15.0% Bd solution in hexane. To the solution was charged a pre-formed catalytic solution mixed in the order of nickel octanoate solution (0.050M, 0.53 mL), 1,3-bis-(2,6-diisopropylphenyl)imidazol-2-ylidene (0.50 M, 0.53 mL), TIBA solution (0.68 M, 0.35 mL), Bd solution (19.7% Bd, 2.5 mL). Finally, boron trifluoride dibutyl etherate solution (1.0 M, 0.59 mL) was charged. The bottle was placed in a 65° C. water bath for four hours. The reaction mixture was treated with isopropanol containing 2,6-di-tert-butyl-4-methylphenol (BHT) in order to deactivate the catalyst, coagulate and stabilize the polymer. The polybutadiene was then dried in a drum-dryer at 120° C. The polymer properties are shown in Table 1.

Examples 2-5

The polymerization runs were carried out in a similar way as Example 1 except that the catalyst components were mixed in the pre-formed solution in a different order, as shown in Table 1.

TABLE 1

|  | Comparative Example | Example 1 | Example 2 | Example 3 | Example 4 | Example 5 |
|---|---|---|---|---|---|---|
| Metal-Containing Compound | Nickel Octanoate | | | Nickel Octanoate | | |

TABLE 1-continued

| | Comparative Example | Example 1 | Example 2 | Example 3 | Example 4 | Example 5 |
|---|---|---|---|---|---|---|
| Alkylating Agent | TIBA | | | TIBA | | |
| Carbene | None | | 1,3-bis-(2,6-diisopropylphenyl)imidazol-2-ylidene | | | |
| Halogen-Containing Compound | $BF_3 \cdot OBu_2$ | | | $BF_3 \cdot OBu_2$ | | |
| Al:Ni | 9:1 | 9:1 | 9:1 | 9:1 | 9:1 | 9:1 |
| $BF_3$:Al | 2.5:1 | 2.5:1 | 2.5:1 | 2.5:1 | 2.5:1 | 2.5:1 |
| Carbene:Ni | 0 | 1:1 | 1:1 | 1:1 | 1:1 | 1:1 |
| Pre-Formed Catalyst | Bd | Ni | Ni | Bd | Bd | Bd |
| Addition Order | TIBA | Carbene | Carbene | Ni | Ni | TIBA |
| | Ni | TIBA | Bd | Carbene | TIBA | Ni |
| | $BF_3$ | Bd | TIBA | TIBA | Carbene | Carbene |
| | | $BF_3$ | $BF_3$ | $BF_3$ | $BF_3$ | $BF_3$ |
| Conversion (%) | 91.6 | 88.0 | 88.2 | 87.2 | 91.0 | 87.8 |
| $ML_{1+4}$ @ 100° C. | 46.8 | 71.4 | 68.4 | 67.8 | 58.3 | 60.5 |
| Mn | 81,169 | 110,205 | 112,138 | 107,178 | 96,866 | 96,342 |
| Mw | 303,613 | 380,353 | 376,302 | 372,379 | 341,734 | 342,739 |
| Mp | 227,898 | 253,380 | 247,742 | 245,245 | 236,903 | 238,741 |
| Mw/Mn | 3.74 | 3.45 | 3.36 | 3.47 | 3.53 | 3.56 |
| Cis-1,4 (%) | 97.46 | 97.94 | 97.94 | 97.95 | 97.75 | 97.83 |
| Trans-1,4 (%) | 1.42 | 1.18 | 1.20 | 1.23 | 1.28 | 1.22 |
| Vinyl (%) | 1.13 | 0.88 | 0.86 | 0.82 | 0.97 | 0.96 |

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A composition comprising:
   (a) a metal-containing compound, said metal being selected from the group consisting of transition metals and lanthanide metals;
   (b) a carbene;
   (c) an alkylating agent;
   (d) a conjugated diene monomer;
   and optionally
   (e) a halogen-containing compound that includes one or more labile halogen atoms, with the proviso that the halogen-containing compound must be present when none of the metal-containing compound and the alkylating agent contains a labile halogen atom.

2. The composition according to claim 1, wherein said carbene comprises a N-heterocyclic carbene of formula I or II:

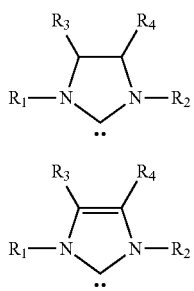

wherein $R_1$ and $R_2$ are selected from the group consisting of $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected but cannot be H;

$R_3$ and $R_4$ are selected from the group consisting of H, $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected.

3. The composition according to claim 2, wherein said carbene comprises a N-heterocyclic carbene of formula III or IV:

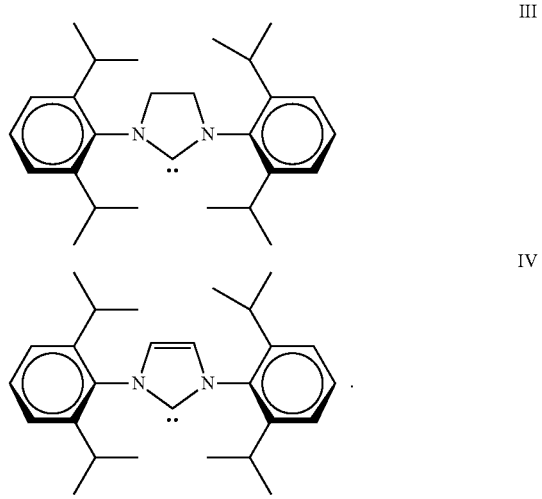

4. The composition according to claim 1, wherein said metal-containing compound comprises nickel.

5. The composition according to claim 1, wherein said metal-containing compound is selected from the group consisting of nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene)nickel, bis(salicylaldehyde)ethylene diimine nickel, cyclopentadienyl-nickel nitrosyl, bis($\eta^3$-allyl)nickel, bis(π-cycloocta-1,5-diene)nickel, bis($\eta^3$-allyl nickel trifluoroacetate), nickel tetracarbonyl, nickel boroacylate, nickel neodecanoate borate, nickel hexanoate borate, nickel naphthenate borate, nickel stearate borate, nickel octoate borate, nickel 2-ethylhexanoate borate, and mixtures thereof.

6. The composition according to claim 1, wherein said metal-containing compound comprises neodymium.

7. The composition according to claim 1, wherein said metal-containing compound is selected from the group consisting of neodymium carboxylate, neodymium organophosphate, neodymium organophosphonate, neodymium organophosphinate, neodymium carbamate, neodymium dithiocarbamate, neodymium xanthate, neodymium β-diketonate, neodymium alkoxide or aryloxide, neodymium halide, neodymium pseudo-halide, neodymium oxyhalide, organoneodymium compound, and mixtures thereof.

8. The composition according to claim 1, wherein said alkylating agent comprises an organoaluminum compound, an organomagnesium compound, or both.

9. The composition according to claim 8, wherein said organoaluminum compound is represented by the formula $AlR^5_n X_{3-n}$, where each $R^5$, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

10. The composition according to claim 9, wherein said organoaluminum compound is selected from the group consisting of trimethylaluminum, triethylaluminum, tripropylaluminum, tributyaluminum, triisobutylaluminum, trihexylaluminum, trioctylaluminum, diisobutylaluminum hydride, and mixtures thereof.

11. The composition according to claim 1, wherein said halogen-containing compound is present and comprises elemental halogen, mixed halogen, hydrogen halide, organic halide, inorganic halide, organometallic halide, and mixtures thereof.

12. The composition according to claim 6, wherein said halogen-containing compound is present and comprises elemental chlorine, elemental bromine, elemental iodine, hydrogen chloride, hydrogen bromide, hydrogen iodide, iodine monochloride, iodine monobromide, iodine trichloride, t-butyl chloride, t-butyl bromide, allyl chloride, allyl bromide, benzyl chloride, benzyl bromide, chloro-diphenylmethane, bromo diphenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, methyl bromoformate, phosphorus trichloride, phosphorus tribromide, phosphorus pentachloride, phosphorus oxychloride, phosphorus oxybromide, boron trichloride, boron tribromide, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, tellurium tetraiodide, tin tetrachloride, tin tetrabromide, aluminum trichloride, aluminum tribromide, antimony trichloride, antimony pentachloride, antimony tribromide, aluminum triiodide, gallium trichloride, gallium tribromide, gallium triiodide, indium trichloride, indium tribromide, indium triiodide, titanium tetrachloride, titanium tetrabromide, titanium tetraiodide, zinc dichloride, zinc dibromide, zinc diiodide, dimethylaluminum chloride, diethylaluminum chloride, dimethylaluminum bromide, diethylaluminum bromide, methylaluminum dichloride, ethylaluminum dichloride, methylaluminum dibromide, ethylaluminum dibromide, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, tributyltin bromide, and mixtures thereof.

13. The composition according to claim 5, wherein said halogen-containing compound is present and comprises a complex of boron trifluoride and a compound selected from the group consisting of $C_1$-$C_5$ aliphatic ethers, alcohols, ketones and carboxylic acids.

14. The polymerization catalyst composition according to claim 2, wherein
(a) said metal-containing compound is selected from the group consisting of nickel naphthenate, nickel octanoate, nickel neodecanoate, and mixtures thereof;
(b) said alkylating agent comprises triethylaluminum, triisobutylaluminum, and mixtures thereof; and
(c) said halogen-containing compound comprises a complex of boron trifluoride and a compound selected from the group consisting of $C_1$-$C_5$ aliphatic ethers, alcohols, ketones and carboxylic acids.

15. A polymerization composition comprising:
(a) a metal-containing compound, said metal being selected from the group consisting of transition metals and lanthanide metals;
(b) a carbene;
(c) an alkylating agent;
(d) a conjugated diene monomer;
and optionally
(e) a halogen-containing compound that includes one or more labile halogen atoms, with the proviso that the halogen-containing compound must be present when none of the metal-containing compound and the alkylating agent contain a labile halogen atom;
wherein said metal-containing compound and said carbene are combined in the presence of at least one of said alkylating agent and, if present, said halogen-containing compound.

16. A process for producing a polydiene comprising reacting a conjugated diene in the presence of a polymerization catalyst composition comprising:
(a) a metal-containing compound, said metal being selected from the group consisting of transition metals and lanthanide metals;
(b) a carbene;
(c) an alkylating agent; and optionally
(d) a halogen-containing compound that includes one or more labile halogen atoms, with the proviso that the halogen-containing compound must be present when none of the metal-containing compound and the alkylating agent contain a labile halogen atom.

17. The process according to claim 16, wherein said carbene comprises a N-heterocyclic carbene of formula I or II:

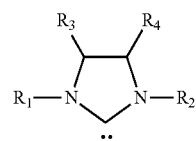

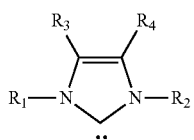

II wherein $R_1$ and $R_2$ are selected from the group consisting of $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected but cannot be H, $R_3$ and $R_4$ are selected from the group consisting of H, $C_1$-$C_{12}$ alkyl, $C_2$-$C_{12}$ alkenyl, $C_2$-$C_{12}$ alkynyl, phenyl, alkyl-substituted phenyl, and combinations thereof and may all be identical or may all be separately selected.

18. The process according to claim 17, wherein said carbene comprises a N-heterocyclic carbene of formula III or IV:

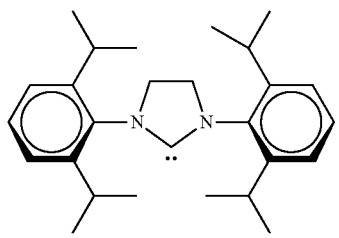

III

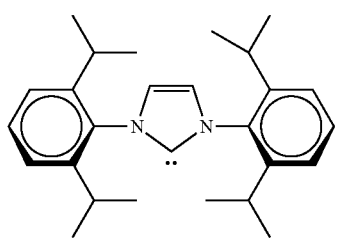

IV

19. A process according to claim 16 wherein said polydiene is produced at a temperature of from about −10° C. to about 100° C.

20. A process according to claim 16 wherein said polydiene is produced during a time period of from about 20 minutes to about 24 hours.

21. A process according to claim 16 wherein said polydiene has a cis content greater than 95%, a number average molecular weight range of from about 60,000 to about 200,000, a molecular weight distribution of from about 2 to about 4, and a vinyl content of less than about 2%.

22. A process according to claim 16 wherein said process is conducted in the presence of a solvent selected from the group consisting of aromatic hydrocarbons, aliphatic hydrocarbons, and cycloaliphatic hydrocarbons, and mixtures thereof.

23. A process according to claim 22 wherein said solvent comprises hexane.

24. The process according to claim 16 wherein said metal-containing compound is present in a catalytic amount of from about 0.01 mmol metal/100 g monomer to about 0.4 mmol metal/100 g monomer.

25. The process according to claim 24 wherein said metal-containing compound is present in a catalytic amount of about 0.02 mmol metal/100 g monomer to about 0.2 mmol metal/100 g monomer.

26. The process according to claim 16 wherein said carbene is present in a catalytic amount of about 0.01 mmol carbene/100 g monomer to about 0.4 mmol carbene/100 g monomer.

27. The process according to claim 26 wherein said carbene is present in a catalytic amount of about 0.02 mmol carbene/100 g monomer to about 0.2 mmol carbene/100 g monomer.

28. The process according to claim 16 wherein said alkylating agent is present in a catalytic amount of from about 0.15 mmol alkylating metal/100 g monomer to about 20.0 mmol alkylating metal/100 g monomer.

29. The process according to claim 28 wherein said alkylating agent is present in a catalytic amount of about 0.30 mmol alkylating metal/100 g monomer to about 6.0 mmol alkylating metal/100 g monomer.

30. The process according to claim 16 wherein said halogen-containing compound is present in a catalytic amount of from about 0.01 mmol halogen-containing compound/100 g monomer to about 12.0 mmol halogen-containing compound/100 g monomer.

31. The process according to claim 30 wherein said halogen-containing compound is present in a catalytic amount of about 0.4 mmol halogen-containing compound/100 g monomer to about 6.0 mmol halogen-containing compound/100 g monomer.

32. The process according to claim 16, wherein said polydiene comprises polybutadiene.

33. The process according to claim 17, wherein
  (a) said metal-containing compound is selected from the group consisting of nickel naphthenate, nickel octanoate, nickel neodecanoate, and mixtures thereof;
  (b) said alkylating agent comprises triethylaluminum, triisobutylaluminum, or mixtures thereof; and
  (c) said halogen-containing compound comprises a complex of boron trifluoride and a compound selected from the group consisting of $C_1$-$C_5$ aliphatic ethers, alcohols, ketones and carboxylic acids.

34. A process for producing a polydiene comprising reacting a conjugated diene in the presence of a polymerization catalyst composition comprising:
  (a) a metal-containing compound, said metal being selected from the group consisting of transition metals and lanthanide metals;
  (b) a carbene;
  (c) an alkylating agent; and optionally
  (d) a halogen-containing compound that includes one or more labile halogen atoms, with the proviso that the halogen-containing compound must be present when none of the metal-containing compound and the alkylating agent contain a labile halogen atom;
wherein said metal-containing compound and said carbene are combined in the presence of at least one of said conjugated diene, said alkylating agent and, if present, said halogen-containing compound.

* * * * *